US008228534B2

(12) United States Patent
Azuma et al.

(10) Patent No.: US 8,228,534 B2
(45) Date of Patent: Jul. 24, 2012

(54) COMMUNICATION SYSTEM, IMAGE FORMATION APPARATUS, CONTROLLER, COMPUTER READABLE MEDIUM AND DATA SIGNAL

(75) Inventors: Kouichi Azuma, Kanagawa (JP); Yukio Yamazaki, Kanagawa (JP); Makoto Kimura, Kanagawa (JP); Shinho Ikeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1315 days.

(21) Appl. No.: 11/907,803

(22) Filed: Oct. 17, 2007

(65) Prior Publication Data

US 2008/0198402 A1 Aug. 21, 2008

(30) Foreign Application Priority Data

Feb. 16, 2007 (JP) ................................ 2007-035948

(51) Int. Cl.
*G06K 15/00* (2006.01)

(52) U.S. Cl. ......... 358/1.15; 399/37; 713/320; 713/330; 713/340

(58) Field of Classification Search .......... 358/419–423, 358/1.15; 399/37; 713/320, 330, 340
See application file for complete search history.

(56) References Cited

U.S. PATENT DOCUMENTS

| | | | | |
|---|---|---|---|---|
| 2006/0164447 A1* | 7/2006 | Poole et al. | ....................... | 347/5 |
| 2007/0132487 A1* | 6/2007 | Kestelli | ......................... | 327/108 |

FOREIGN PATENT DOCUMENTS

| | | |
|---|---|---|
| JP | A 09-134096 | 5/1997 |
| JP | A 09-166942 | 6/1997 |
| JP | A-10-319788 | 12/1998 |
| JP | A-2001-125473 | 5/2001 |
| JP | A-2001-147747 | 5/2001 |
| JP | A-2002-158812 | 5/2002 |
| JP | A-2002-223310 | 8/2002 |
| JP | A-2007-027866 | 2/2007 |

OTHER PUBLICATIONS

Oct. 11, 2001 Office Action issued Japanese Patent Application No. 2007-035948 (with translation).

* cited by examiner

*Primary Examiner* — King Poon
*Assistant Examiner* — Lawrence Wills
(74) *Attorney, Agent, or Firm* — Oliff & Berridge, PLC

(57) ABSTRACT

An image formation apparatus includes a reception section, a function section, an image formation section and a power output device. The reception section is configured to be connected to a communication line over which image information and power are transmitted. The reception section receives the image information and the power transmitted over the communication line. The function section receives supply of the power received by the reception section, to function. The image formation section forms an image on a medium based on the image information received by the reception section or the function section. The power output device receives power supply from a commercial power supply. The power output device outputs power of a predetermined voltage to the image formation section.

8 Claims, 9 Drawing Sheets

(FIG.8 CONTINUED)
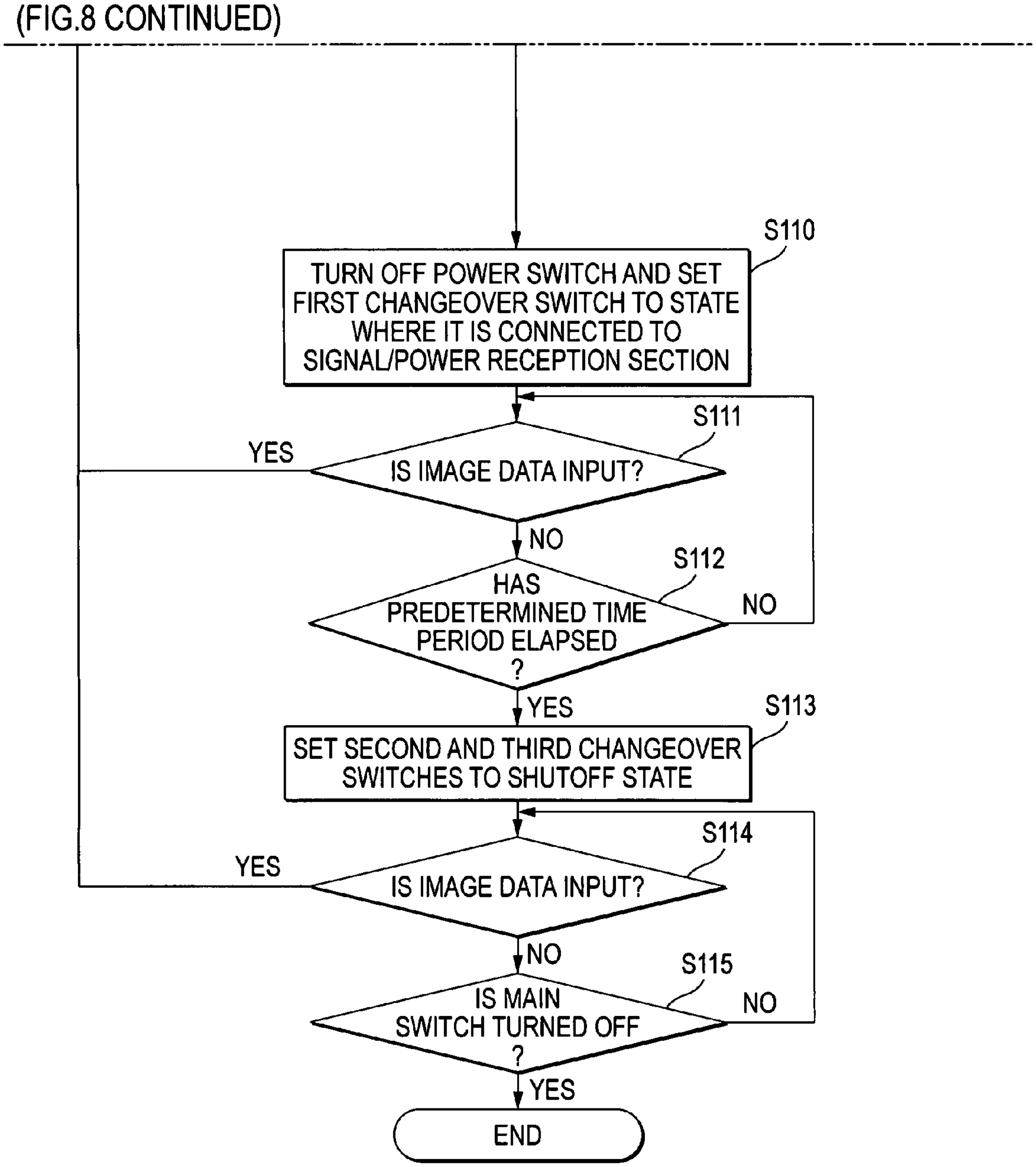

COMMUNICATION SYSTEM, IMAGE FORMATION APPARATUS, CONTROLLER, COMPUTER READABLE MEDIUM AND DATA SIGNAL

CROSS-REFERENCE TO RELATED APPLICATIONS

This application is based on and claims priority under 35 U.S.C. §119 from Japanese Patent Application No. 2007-35948 filed Feb. 16, 2007.

BACKGROUND

1. Technical Field

The invention relates to a communication system, an image formation apparatus, a controller, a computer readable medium and a data signal.

2. Related Art

Some image formation apparatus having a print function and a facsimile function is set to be in a standby state in which it waits for data output from a personal computer (PC), etc., while it does not perform an image formation operation. In the standby state, power supply to a control section for controlling the image formation operation, etc., is maintained at all times so that the image formation apparatus can be ready for dealing with data transmission from a PC, etc., at any time.

SUMMARY

According to an aspect of the invention, a communication system includes a relay device, and a plurality of image forming apparatus. The relay device includes a first power output device and an output section. The first power output device is configured to convert a voltage of a commercial power supply to a voltage to be output. The output section is configured to output power of the converted voltage to the plurality of image formation apparatus over a communication line. The plurality of image formation apparatus are connected to the relay device through the communication line. The image formation apparatus receive the power output from the relay device. Each of the image formation apparatus includes a function section, a second power output device, an image formation section and a distribution-and-transmission section. The function section performs a function by using the power output from the relay device. The second power output device converts a voltage of a commercial power supply to a predetermined voltage, and outputs power of the predetermined voltage. The image formation section forms an image on a medium by using the power of the predetermined voltage output from the second power output device. The distribution-and-transmission section receives the power output from the relay device. The distribution-and-transmission section supplies the power output from the relay device to the function section.

BRIEF DESCRIPTION OF THE DRAWINGS

Exemplary embodiments of the invention will be described below in detail with reference to the accompanying drawings, wherein.

DETAILED DESCRIPTION

Referring now to the accompanying drawings, exemplary embodiments of the invention will be described.

First Exemplary Embodiment

Figure 1:
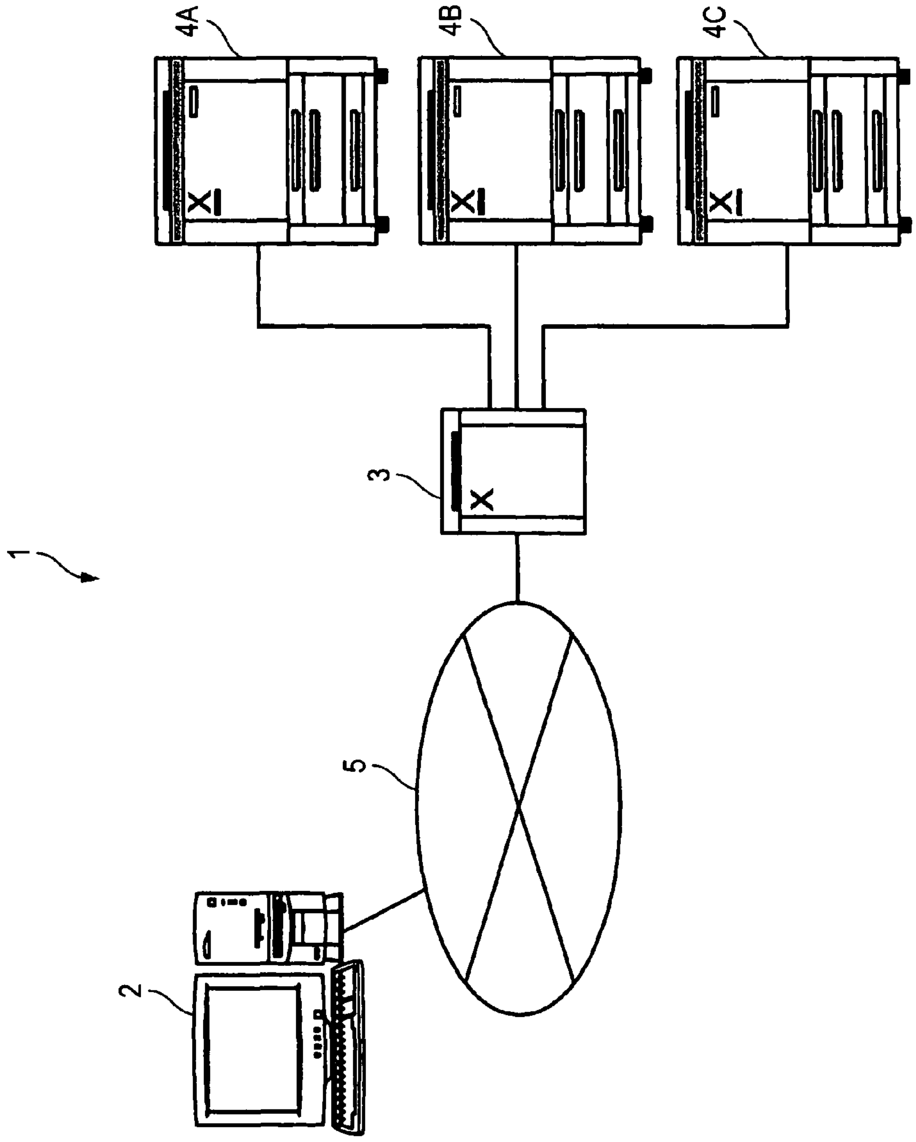
FIG. 1 is a drawing to show the general configuration of a communication system of an exemplary embodiment of the invention.

FIG. 1 is a drawing to show the general configuration of a communication system 1 of an exemplary embodiment of the invention. The communication system 1 shown in FIG. 1 includes a terminal device 2 installed in a user's work space (such as a desk), etc., for example, and multifunction devices 4A to 4C (which will also be hereinafter collectively called "multifunction device 4") as an example of an image formation apparatus for performing a process of printing image data generated by the terminal device 2 on a medium such as recording paper (which will be hereinafter called "paper"). The terminal device 2 and the multifunction devices 4 are connected through a hub 3 as an example of a relay device and through a network 5, such as a LAN (Local Area Network), a WAN (Wide Area Network) and the Internet, that utilizes a communication line and a cable so that they can communicate with each other bidirectionally.

The communication line may contain a telephone line and a satellite communication line (for example, spatial transmission line in digital satellite broadcasting). In the communication system 1 of the exemplary embodiment, plural terminal devices 2 and plural multifunction devices 4 may be connected through the network 5. In the configuration shown in FIG. 1, the case where one terminal device 2 and three multifunction devices 4A to 4C are connected is shown by way of example.

The terminal device 2 has functions of creating, storing, etc., image data made up of a document, a pattern, a photo, etc. When the created image data or the stored image data is printed, the terminal device 2 converts the image data, etc., into a print command to the multifunction device 4 and generates print data as a print job. The print data contains attribute data to set up various print functions, specify the multifunction device 4 to print, etc., in addition to the image data. For example, a personal computer (PC) is used as the terminal device 2.

Figure 2:
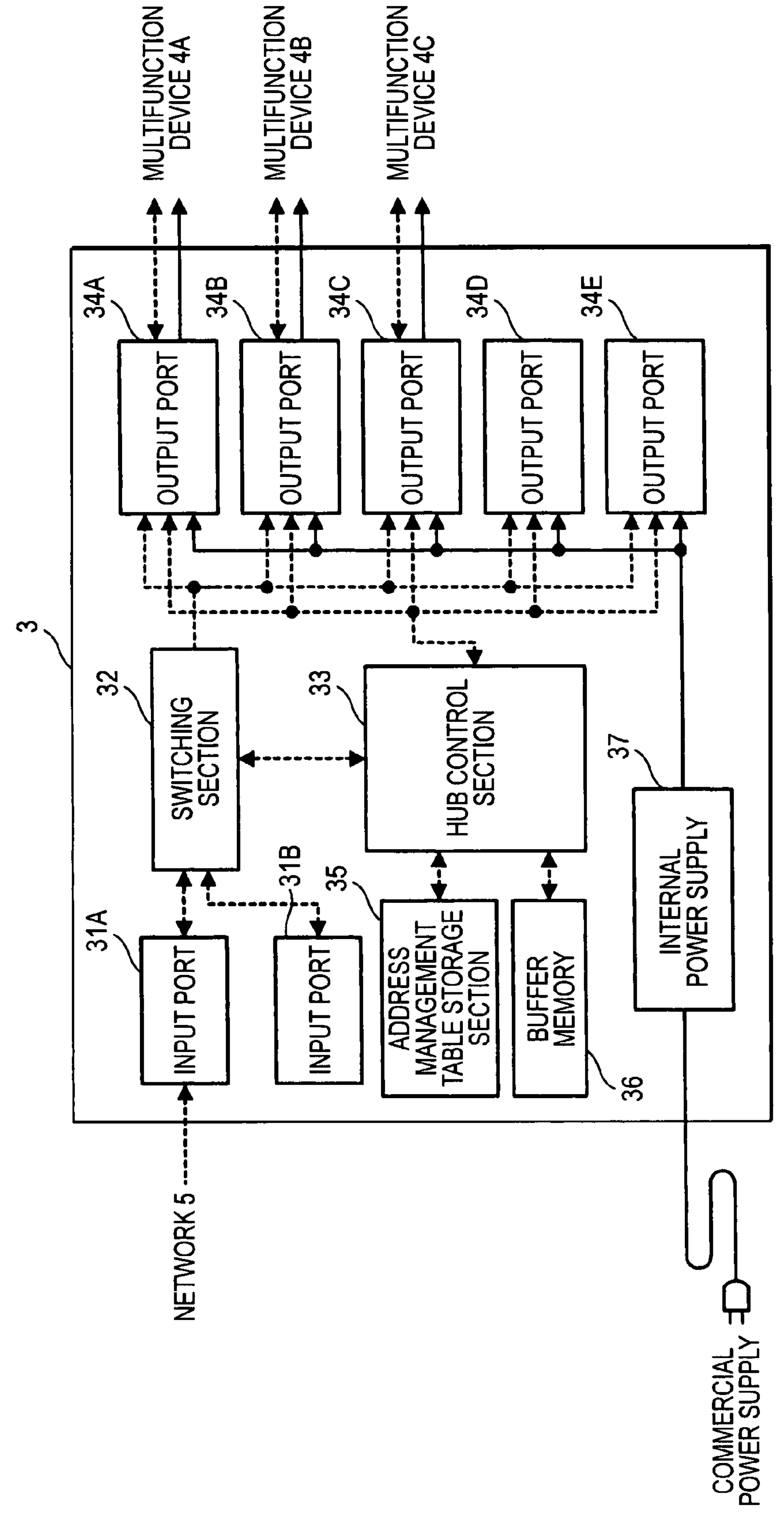
FIG. 2 is a block diagram to describe the functional configuration of a hub.

The hub 3 has a function of distributing the image data generated by the terminal device 2 to the multifunction device 4 specified by the terminal device 2. FIG. 2 is a block diagram to describe the functional configuration of the hub 3. As shown in FIG. 2, the hub 3 includes plural input ports 31A and 31B (which will also be hereinafter collectively called "input port 31"), a switching section 32, a hub control section 33, plural output ports 34A, 34B, 34C, 34D, and 34E (which will also be hereinafter collectively called "output port 34"), an address management table storage section 35, a buffer memory 36, and an internal power supply 37 as an example of a first power output device. In FIG. 2, signal lines for transmitting signals such as a data signal and a control signal are indicated by dashed lines, and power lines for supplying power to function sections are indicated by solid lines.

The input ports 31A and 31B are connected to the network 5 through a signal cable (communication line) such as a LAN cable, for example. Each of the input ports 31A and 31B receives print data from the terminal device 2 and transmits the received print data through the switching section 32 to the hub control section 33.

The switching section 32 transmits the print data received by the input port 31 to the hub control section 33. The switching section 32 also transmits the print data to the output port 34 to which the multifunction device 4 specified by the print data is connected under the control of the hub control section 33.

The internal power supply 37, for example, converts AC power of 115 V supplied from a commercial power supply into DC power of 5 V, and supplies 5 V to the output ports 34A to 34E. The internal power supply 37 also supplies drive power to the respective function sections in the hub 3 over a power line (not shown).

The hub control section 33 acquires the print data received by the input port 31, through the switching section 32. The hub control section 33 stores the print data in the buffer memory 36. The hub control section 33 also analyzes the acquired print data and determines an output port 34 to which the print data is to be distributed. The hub control section 33 gives a command of setting the output port 34, to the switching section 32 which then sets the output port 34 to which the print data is to be distributed. The hub control section 33 transmits the print data stored in the buffer memory 36 to the setup output port 34 through the switching section 32.

The hub control section 33 determines the output port 34 to which the print data is to be distributed based on a MAC address of Ethernet®, for example. That is, the address management table storage section 35 stores an address management table indicating a correspondence relation between MAC addresses and the output ports 34, to manage which MAC address of a multifunction device 4 is connected to which output port 34. The hub control section 33 references the address management table of the address management table storage section 35, and determines the output port 34 to which the print data is to be distributed based on the MAC address at the top of the received print data. When print data is received, the address management table is automatically created based on the input port 31 which receives the print data and the MAC address, contained in the print data, of the terminal device 2 which transmits the print data. An administrator of the communication system 1 may also add a correspondence relation between a specific output port 34 and a specific MAC address to the address management table. If a correct entry is not registered in the address management table, the received print data is transmitted to all the output ports 34 (34A to 34E). However, once print data is received, the MAC address is automatically learnt and the address management table is automatically updated.

The hub control section 33 determines as to whether or not each of the output ports 34A to 34E is connected to the multifunction device 4 including a signal/power reception section conforming to a specific standard (for example, IEEE802.3af; see "signal/power reception section 103" described later with reference to FIG. 3). That is, the hub control section 33 determines as to whether or not the signal/power reception section which can receive a data signal and power simultaneously and which is included in the multifunction device 4 connected to the output port 34A to 34E conforms to the specific standard (for example, IEEE802.3af). If it is determined that the output port 34 is connected to the multifunction device 4 including the signal/power reception section 103 conforming to the specific standard, power from the internal power supply 37 is supplied to the multifunction device 4 through the output port 34 under the control of the hub control section 33.

The output ports 34A to 34E are connected to the multifunction devices 4 through signal cables (communication lines) such as LAN cables, for example. The print data received by the input port 31 is transmitted to the multifunction device 4 under the control of the hub control section 33 as described above.

If the hub control section 33 determines that the output port 34A to 34E is connected to the multifunction device 4 including the signal/power reception section conforming to the specific standard, for example, 5-V power from the internal power supply 37 is supplied to the multifunction device 4 through the output port 34.

In the communication system 1 of the exemplary embodiment, it is assumed that the multifunction device 4A is connected to the output port 34A, the multifunction device 4B is connected to the output port 34B, and the multifunction device 4C is connected to the output port 34C and that each of the multifunction devices 4A to 4C includes the signal/power reception section conforming to the specific standard (for example, IEEE802.3af).

The hub control section 33 determines as to whether or not the output port 34 is connected to the multifunction device 4 including the signal/power reception section conforming to the specific standard in the following manner. For example, a voltage of a predetermined value is supplied from the output port 34, to which the multifunction device 4 is connected, to the multifunction device 4 and a flowing current value at that time is detected. Then, it is checked based on the supplied voltage value and the detected current value, as to whether or not the signal/power reception section of the multifunction device 4 has a predetermined resistance value (for example, 25 kΩ). As a result, if the signal/power reception section of the multifunction device 4 has the predetermined resistance value, the hub control section 33 determines that the output port 34 is connected to the multifunction device 4 including the signal/power reception section conforming to the specific standard.

From the output port 34 connected to the multifunction device 4 including the signal/power reception section conforming to the specific standard, the power from the internal power supply 37 is supplied to the multifunction device 4 under the control of the hub control section 33.

The multifunction device 4 may be a multifunctional machine having functions such as a copying function, a facsimile function, and a printing function. The multifunction device 4 prints image data generated, etc., by the terminal device 2, prints image data received by fax, copies an image, etc., for example. FIG. 3 is a block diagram to describe the functional configuration of the multifunction device 4. As shown in FIG. 3, the multifunction device 4 includes: a control section 10 as an example of a controller that controls the whole operation of the multifunction device 4 in accordance with a predetermined processing program; an image reading function section 20 as an example of a function section formed of a scanner, etc.; an operation panel 30 as an example of a function section that displays various pieces of information and accepting operation input by a user; a card read section 40 as an example of a function section that recognizes an IC card, a magnetic card, etc., used as a key for authenticating a use permission authority of the multifunction device 4, for example; a data output section 50 as an example of a function section that outputs image data read through the image reading function section 20 to a storage device such as USB (Universal Serial Bus) memory, etc., for example; and a facsimile (FAX) function section 60 as an example of a function section that transmits and receives an image through a public network. It is not necessary that the image reading function section 20, the operation panel 30, the card read section 40, the data output section 50, and the FAX function section 60 are built-in the multifunction device 4. Alternatively, those sections may be installed outside the multifunction device 4 as external components. Hereinafter, the function sections may also be called a signal input/output function section.

The multifunction device 4 also includes: an image formation section 90 as an example of an image formation section using an electrophotography system, for example, that prints an image on paper; a main power supply 70 as an example of a second power output device that converts AC power of 115V from a commercial power supply into DC power of 24 V, 12 V and/or 5 V, etc., for example, compatible with the respective component sections of the image formation section 90 and that supplies the converted power to the respective component sections of the image formation section 90; and a power switch 71 that selectively sets either a connection state or a shutoff state between the commercial power supply and the main power supply 70 under the control of the control section 10.

Figure 3:
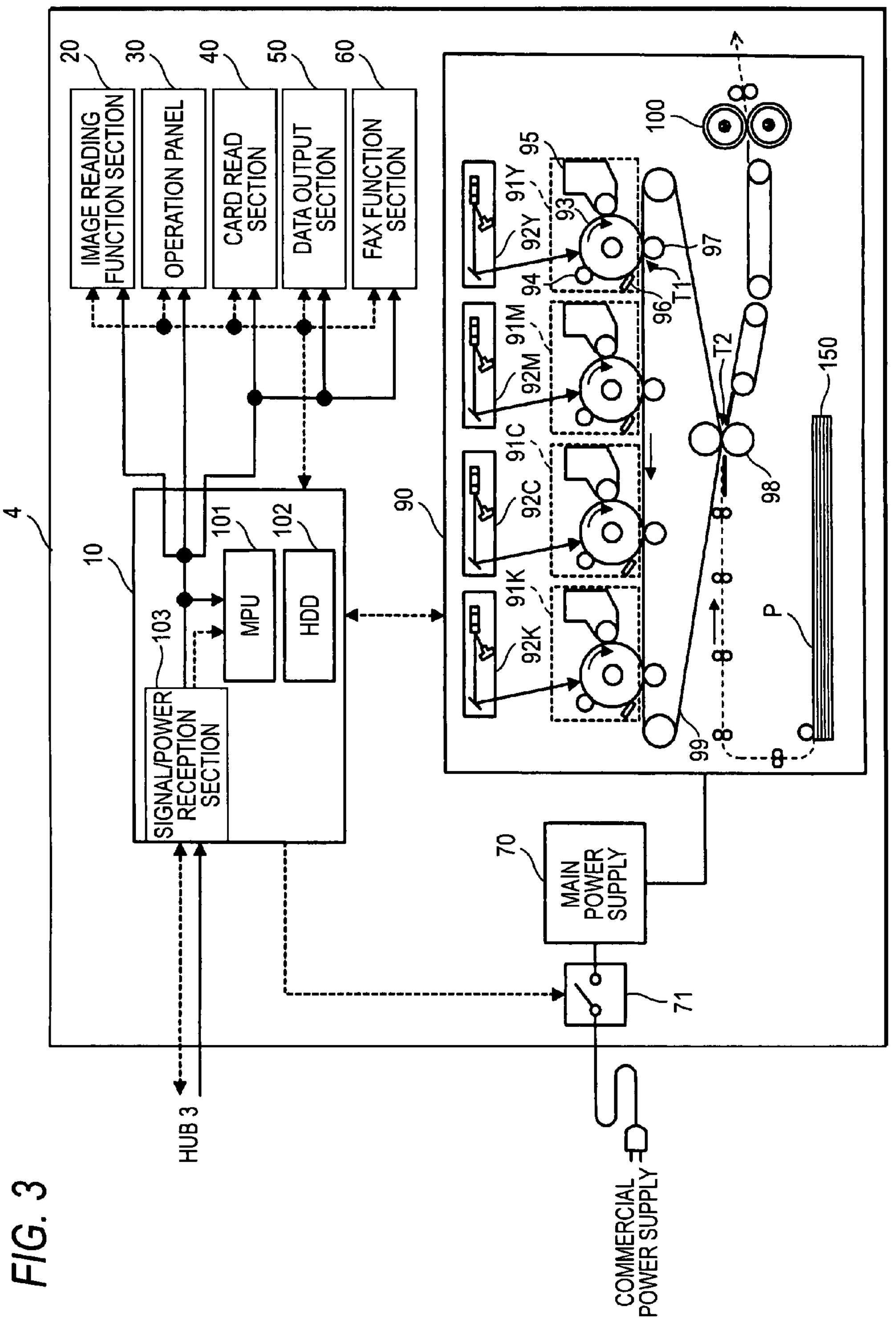
FIG. 3 is a block diagram to describe the functional configuration of a multifunction device.

Also in FIG. 3, as in FIG. 2, signal lines for transmitting signals such as a data signal and a control signal are indicated by dashed lines and power lines for supplying power to the function sections are indicated by solid lines.

The control section 10 includes: an MPU (Micro Processing Unit) 101 that executes a digital computation process in accordance with a predetermined processing program; an HDD (Hard Disk Drive) 102 that stores processing programs, image data, etc.; and a signal/power reception section 103 as an example of a reception section that receives the print data and the power from the hub 3. The image reading function section 20, the operation panel 30, the card read section 40, the data output section 50, the FAX function section 60, and the image formation section 90 are connected to the control section 10 by the signal lines (dashed lines), and the control section 10 controls the operation of those function sections.

The signal/power reception section 103 is configured to conform to the specific standard (for example, IEEE802.3af), and receives a data signal (print data) and power from the hub 3. The signal/power reception section 103 transmits the received print data to the MPU 101. The signal/power reception section 103 also supplies the power supplied from the hub 3 to the MPU 101 of the control section 10, the image reading function section 20, the operation panel 30, the card read section 40, the data output section 50, and the FAX function section 60 at all times. Thus, the signal/power reception section 103 may function as a distribution-and-transmission section that distributes and transmits the print data and the power to the respective sections.

That is, the MPU 101 for performing the whole operation control, etc., of the multifunction device 4 and the image reading function section 20, the operation panel 30, the card read section 40, the data output section 50, and the FAX function section 60 which are an example of a signal input/output function section that executes input/output of a data signal, a control signal, etc., as a main function and which are driven with low power consumption of about 10 W at the maximum are connected to the signal/power reception section 103 by power lines (solid lines). The power from the signal/power reception section 103 is supplied to them at all times. Even in a standby mode in which power supply to the image formation section 90 is stopped (described later), the MPU 101 and the signal input/output function sections are configured to function with the power supplied from the hub 3 through the signal/power reception section 103. For example, the MPU 101 monitors the network 5 at all times and receives input of transmitted image data even in the standby mode. The operation panel 30 accepts operation input by the user at all times. The FAX function section 60 receives facsimile transmission over a public network at all times. Likewise, the card read section 40 and the data output section 50 also function at all times.

The image formation section 90 is an electrophotographic image formation section and includes four image formation units 91Y, 91M, 91C, and 91K (which will also be hereinafter collectively called "image formation unit 91") placed in parallel with a given spacing as shown in FIG. 3. The image formation unit 91 includes a photoconductor drum 93 for forming an electrostatic latent image and holding a toner image, a charger 94 for charging a surface of the photoconductor drum 93 uniformly at a predetermined potential, a developing device 95 for developing the electrostatic latent image formed on the photoconductor drum 93, and a drum cleaner 96 for cleaning the surface of the photoconductor drum 93 after transfer.

Laser exposure devices 92Y, 92M, 92C, and 92K (which will also be hereinafter collectively called "laser exposure device 92") for exposing the photoconductor drum 93 to light based on image data from an image processing section (not shown) of the image formation section 90 are provided corresponding to the respective image formation units 91Y, 91M, 91C, and 91K.

The configurations of the image formation units 91 are roughly similar except the toner stored in the developing device 95. The image formation units 91Y, 91M, 91C, and 91K form yellow (Y), magenta (M), cyan (C), and black (K) toner images, respectively.

The image formation section 90 also includes: an intermediate transfer belt 99 onto which the color toner images formed in the photoconductor drums 93 of the image formation units 91 are transferred in a multiple transfer manner; a primary transfer roll 97 for transferring the color toner images of the image formation units 91 onto the intermediate transfer belt 99 in sequence in a primary transfer section T1 (primary transfer); a secondary transfer roll 98 for collectively transferring the superposed toner image transferred onto the intermediate transfer belt 99, onto paper P of a record material (recording paper) in a secondary transfer section T2 (secondary transfer); and a fuser 100 for fixing the secondary-transferred image on the paper P.

If an operation state in which the image formation operation (called "image formation operation mode") is executed is set in the multifunction device 4 of the exemplary embodiment, the image formation operation is performed in the image formation section 90 based on various control signals supplied from the control section 10. That is, if image data is input from the signal/power reception section 103 of the control section 10, the image reading function section 20, or the FAX function section 60, etc., the control section 10 sets the power switch 71 to the connection state so as to supply power from the main power supply 70 to the image formation section 90. The control section 10 transmits, to the image formation section 90, the image data input from the signal/ power reception section 103 of the control section 10, the image reading function section 20 or the FAX function section 60, etc.

In the image formation section 90, predetermined image processing is performed for the received image data by the image processing section (not shown) of the image formation section 90, and each color image component is supplied to each laser exposure device 92. For example, in the yellow image formation unit 91Y, the laser exposure device 92Y scans over and exposes the surface of the photoconductor drum 93, which is uniformly charged at a predetermined potential by the charger 94, and an electrostatic latent image involved in the Y image component is formed on the photoconductor drum 93. The electrostatic latent image involved in the Y image component formed on the photoconductor drum 93 is developed by the developing device 95 to form a yellow (Y) toner image. Likewise, magenta (M), cyan (C), and black (K) toner images are also formed in the image formation units 91M, 91C, and 91K.

The color toner images formed in the image formation units 91 are electrostatically attracted onto the intermediate transfer belt 99 moving in the arrow direction in FIG. 3 in sequence by the primary transfer roll 97 to form a superposed toner image. The superposed toner image on the intermediate transfer belt 99 is transported to an area where the secondary transfer roll 98 is disposed (secondary transfer section T2) with a move of the intermediate transfer belt 99. When the superposed toner image is transported to the secondary transfer section T2, paper P is supplied from a paper retention section 150 to the secondary transfer section T2 at the timing at which the toner image is transported to the secondary transfer section T2. The superposed toner image is collectively electrostatically transferred onto the transported paper P according to a transfer electric field formed by the secondary transfer roll 98 in the secondary transfer section T2.

Then, the paper P onto which the superposed toner image is electrostatically transferred is peeled off from the intermediate transfer belt 99 and is transported to the fuser 100. The unfixed toner image on the paper P transported to the fuser 100 undergoes fixing treatment of heat and pressure by the fuser 100, whereby it is fixed onto the paper P. The paper P with the fixed image formed thereon is transported to an ejected paper stack section (not shown) provided in an ejection section of the multifunction device 4.

On the other hand, in the multifunction device 4 of the exemplary embodiment, if image data is not input from any of the signal/power reception section 103 of the control section 10, the image reading function section 20, the FAX function section 60, etc., until a predetermined time period set by the user, for example, has elapsed since completion of the image formation operation mode, the control section 10 sets the power switch 71 to the shutoff state so as to stop the power supply from the main power supply 70 to the image formation section 90. Accordingly, power consumption in the fuser 100, etc., that consumes large power particularly in the image formation section 90 is stopped and unnecessary consumption of energy is suppressed. The operation state in which power supply to the image formation section 90 is stopped is called a “standby mode.”

If the multifunction device 4 is set to the standby mode, the power supplied from the hub 3 through the signal/power reception section 103 is transmitted at all times to the MPU 101 of the control section 10, the image reading function section 20, the operation panel 30, the card read section 40, the data output section 50, and the FAX function section 60 over the power lines (solid lines) between the signal/power reception section 103 and the respective sections as described above. Thus, in the standby mode, the respective function sections are also kept in a state where the respective function sections can function.

Thus, image data can be input from the signal/power reception section 103 of the control section 10, the image reading function section 20, and the FAX function section 60 not only in the image formation operation mode, but also in the standby mode. If image data is input from the signal/power reception section 103 of the control section 10, the image reading function section 20, or the FAX function section 60, etc., the control section 10 sets the power switch 71 to the connection state and causes the multifunction device 4 to promptly make a transition to the image formation operation mode.

The use permission authority of the multifunction device 4 can be authenticated through the card read section 40 in a state where power supply to the image formation section 90 remains stopped in the standby mode. Further, for example, the image data, etc., stored in the HDD 102 of the control section 10 can be downloaded from the data output section 50 into a USB memory, etc., for example.

The functions of the multifunction device 4 of the exemplary embodiment operate in a similar manner not only in the standby mode in which a main switch (not shown) of the multifunction device 4 is set to an on state, but also in a mode in which the main switch of the multifunction device 4 is set to an off state.

Accordingly, it is eliminated to unnecessarily supply power to the whole multifunction device 4 when simple operation such as only image data input, authentication of the use permission authority for the multifunction device 4 or image data download is performed, and unnecessary consumption of energy is suppressed. Also the above configuration does not require, separately from the main power supply 70, a power supply section for supplying power to the MPU 101, the signal input/output function sections of the image reading function section 20, etc., when the standby mode is set.

As described above, in the communication system 1 of the exemplary embodiment, in all of the multifunction devices 4A to 4C connected to the hub 3, the MPU 101 of the control section 10, the image reading function section 20, the operation panel 30, the card read section 40, the data output section 50, and the FAX function section 60 are connected to the signal/power reception section 103 through the power lines (solid lines), and power from the hub 3 is transmitted at all times through the signal/power reception section 103. The function sections in each of the multifunction devices 4A to 4C are configured so as to function with the power supplied from the hub 3 even in the standby mode in which power supply to the image formation section 90 is stopped. That is, the MPUs 101 of the control sections 10 and the signal input/output function sections of the image reading function sections 20, etc., in the multifunction devices 4A to 4C are all driven upon reception of power supply from the internal power supply 37 of the hub 3.

Thus, the MPUs 101 of the control sections 10 and the signal input/output function sections of the image reading function sections 20, etc., in the multifunction devices 4A to 4C are configured so as to receive power from the internal power supply 37 of the hub 3 which functions as a power supply common to them. Thereby, the energy consumption as the whole communication system 1 is decreased.

By the way, among image formation apparatus of related art, for example, some multifunction device is configured to separately include a sub-power supply section for driving an image reading function section, an operation panel, a FAX function section, etc., which consume a comparatively small power amount, and a main power section for driving an image formation section which consumes a large power amount. In such a multifunction device, the sub-power supply section for driving the image reading function section, etc., is always kept in an on state so that input of external image data can be handled at any time. Also, the main power section for driving the image formation section is set to an on state only in the image formation operation time. Thereby, power consumption in the standby mode is decreased.

However, for example, in the configuration in which plural multifunction devices are connected to a network, the sub-power supply section of each of the multifunction devices is always kept in an on state. Generally, the power loss occurring in a power supply section contains fixed loss occurring in the internal circuit of the power supply section and conversion loss occurring when voltage is converted, for example, from AC 115 V of commercial power supply into a specific voltage (for example, DC 5 V). The conversion loss has a characteristic fluctuating depending on a load in a function section. On the other hand, the fixed loss occurs in the internal circuit of the power supply section. Thus, the fixed loss does not depend on the load in a function section and is an almost constant power loss responsive to the circuit configuration. Thus, if plural power supply sections are driven, the fixed losses corresponding to the number of multifunction devices (=fixed loss×number of devices) are consumed at the minimum regardless of the loads in the function sections connected to the power supply sections.

Figure 4:
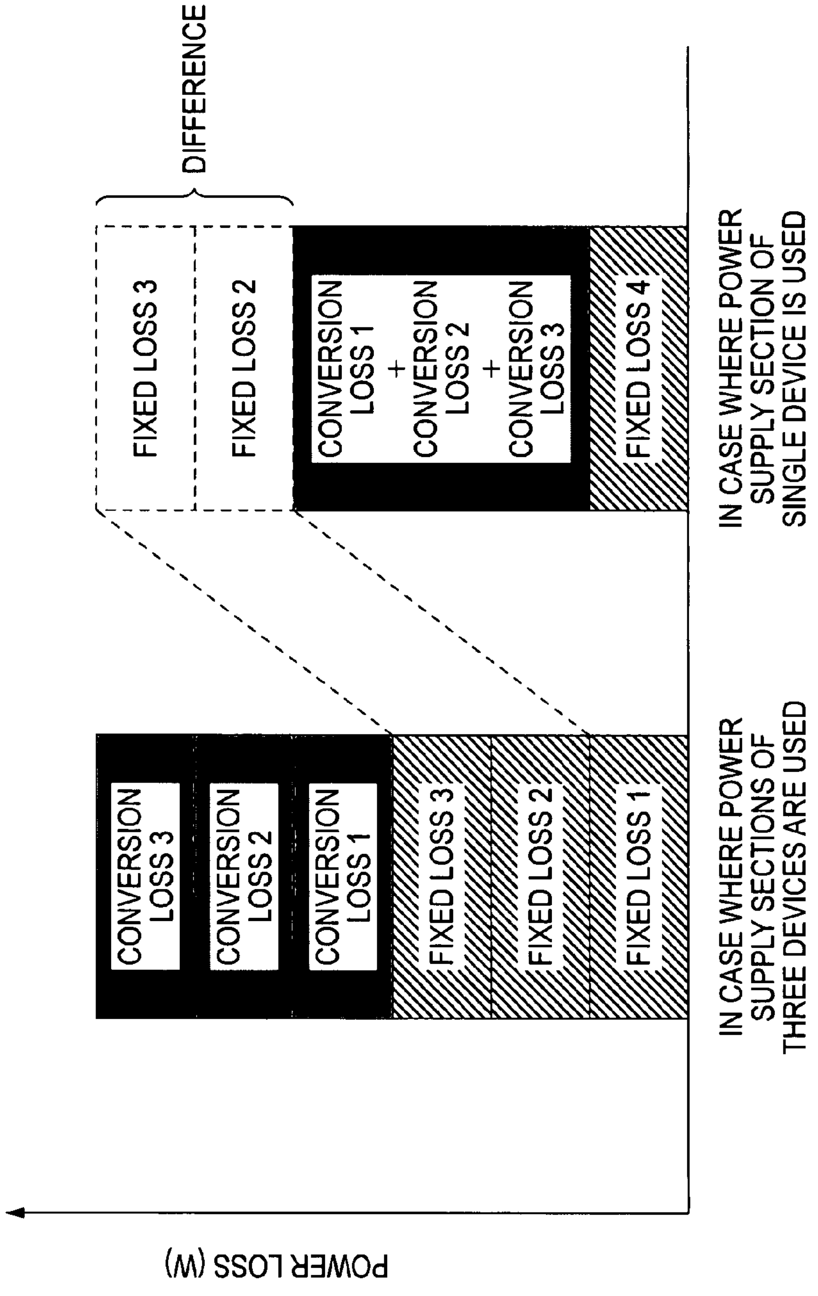
FIG. 4 is a drawing to compare power losses in the whole communication system.

FIG. 4 is a drawing to compare between (i) the whole power loss of the communication system when the power supply sections placed in three multifunction devices drive their respective signal input/output function sections and (ii) the whole power loss of the communication system when one power supply section drives the signal input/output function sections placed in three multifunction devices in the communication system, as an example in the multifunction devices connected to the same communication system. In FIG. 4, it is assumed that the power supply sections have the same circuit configuration and are the same in fixed loss. That is, in the following description, it is assumed that fixed loss 1=fixed loss 2=fixed loss 3=fixed loss 4.

As shown in FIG. 4, when the three power supply sections are used, fixed loss occurs in each of the power supply sections and thus as the whole power loss of the communication system, the power losses in the power supply sections of the three devices are summed up as (fixed loss 1+conversion loss 1)+(fixed loss 2+conversion loss 2)+(fixed loss 3+conversion loss 3).

On the other hand, when a single power supply section is used, the conversion loss becomes that corresponding to the signal input/output function sections of the three devices (≈conversion loss 1+conversion loss 2+conversion loss 3) because of an increase in load when the signal input/output function sections of the three multifunction devices are driven. However, the fixed loss becomes that for a single power supply section. That is, the whole power loss of the communication system becomes (fixed loss 4+conversion loss 1+conversion loss 2+conversion loss 3).

Therefore, a difference between the whole power loss of the communication system that uses a single power supply section and the whole power loss of the communication system that uses three power supply sections is the fixed loss for two power supply sections (=conversion loss 2+conversion loss 3). That is, from the viewpoint of the power loss, if the configuration that a small number of power supply sections cover a large number of power loads is employed, efficiency of the whole energy consumption of the communication system.

Figure 5:
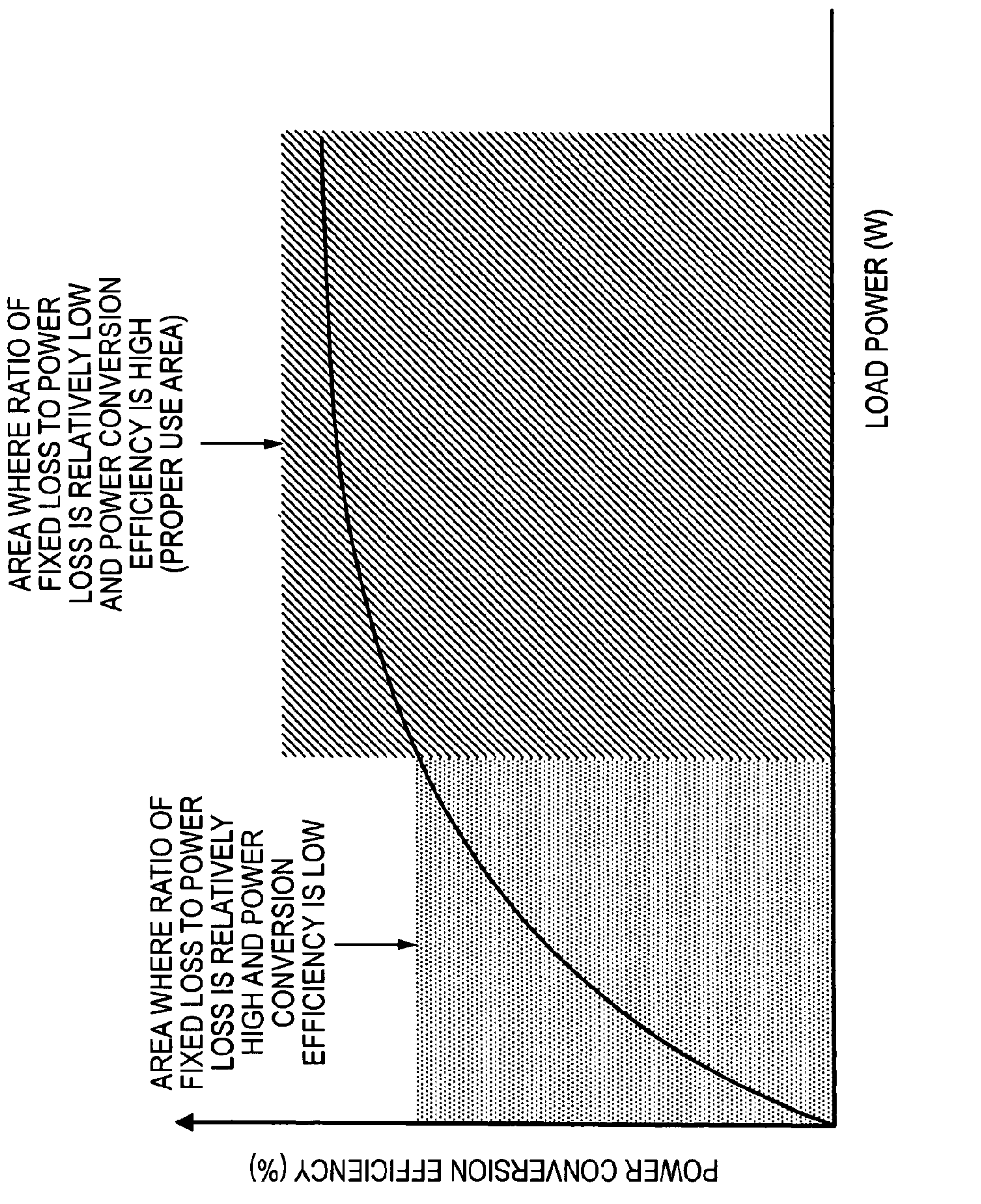
FIG. 5 is a drawing to show a relationship between power conversion efficiency of a power supply section and load power caused by a signal input/output function section connected to the power supply section.

FIG. 5 is a drawing to show a relationship between the power conversion efficiency of a power supply section and load power of a signal input/output function section connected to the power supply section. Also as shown in FIG. 4, in an area where the load power of the signal input/output function section is small, a ratio of the fixed loss which is determined based on the circuit configuration is relatively large and the power consumed in the circuit of the power supply section becomes relatively large. Therefore, the power conversion efficiency of the whole power supply section is small. On the other hand, in an area where the load power of the signal input/output function section is large, the ratio of the fixed loss is relatively small and the power consumed in the circuit of the power supply section becomes relatively small. Therefore, the power conversion efficiency of the whole power supply section becomes large. Therefore, when viewed from the power conversion efficiency which is a viewpoint of countermeasures against power loss, the configuration that a single power supply section covers a large number of power loads also leads to enhancement of the efficiency of the whole energy consumption of the communication system.

Then, in the communication system 1 of the exemplary embodiment, the MPUs 101 of the control sections 10 and the signal input/output function sections of the image reading function sections 20, etc., in the multifunction devices 4A to 4C are configured to receive power from the internal power supply 37 of the hub 3 which functions as the power supply common to them. Accordingly, the single internal power supply 37 of the hub 3 covers all load power of the MPUs 101 of the control sections 10 and the signal input/output function sections of the image reading function sections 20, etc., in the multifunction devices 4A to 4C, the power loss of the whole power supply section included in the communication system 1 is decreased, and the power conversion efficiency is enhanced. Thus, the energy consumption of the whole communication system 1 can be decreased.

As described above, in the communication system 1 of the exemplary embodiment, the internal power supply 37 included in the hub 3 for receiving image data from the network 5 is configured to supply power to the MPUs 101 of the control sections 10 and the signal input/output function sections of the image reading function sections 20, etc., placed in the multifunction devices 4A to 4C connected to the hub 3, as the power supply common to them. Accordingly, the energy consumption as the whole communication system 1 can be decreased.

Second Exemplary Embodiment

In the first exemplary embodiment, description has been made on the configuration that power is supplied at all times from the internal power supply 37 included in the hub 3 to the MPUs 101 of the control sections 10 and the signal input/output function sections of the image reading function sections 20, etc., which are disposed in the multifunction devices 4A to 4C. In a second exemplary embodiment of the invention, the following configuration will be described. That is, power is supplied at all times from an internal power supply 37 included in a hub 3 only to MPUs 101 in control sections 10 and some of signal input/output function sections disposed in multifunction devices 4A to 4C. Also, power is supplied to the other signal input/output function sections if necessary.

Components similar to those of the first exemplary embodiment are denoted by similar reference numerals and will not be described again in detail.

Figure 6:
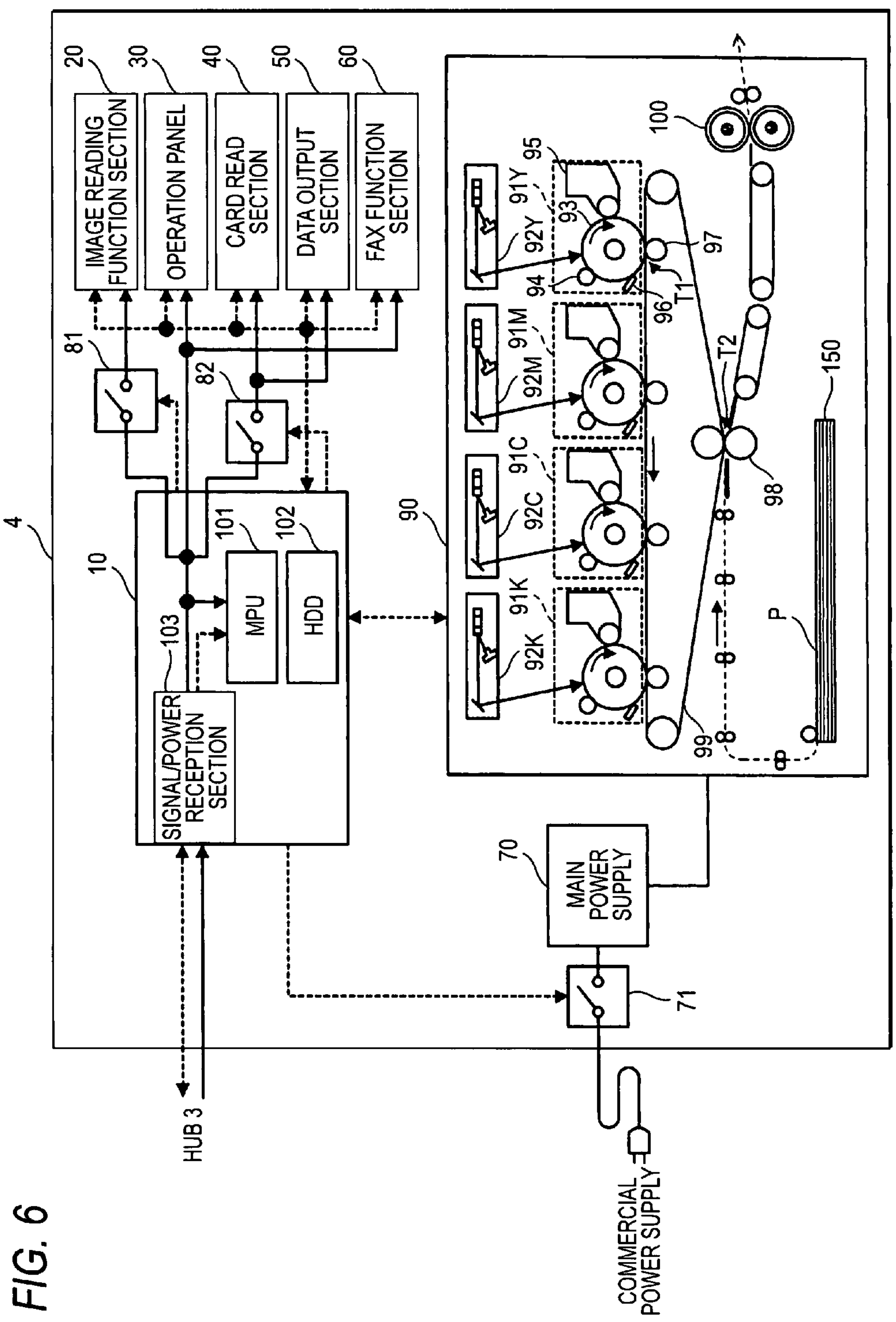
FIG. 6 is a block diagram to describe the functional configuration of a multifunction device.

FIG. 6 is a block diagram to describe the functional configuration of a multifunction device 4 of the second exemplary embodiment. The multifunction device 4 (4A to 4C) shown in FIG. 6 includes: a changeover switch 81 as an example of a switch section that selectively sets either a connection state or a shutoff state between the signal/power reception section 103 of the control section 10 and the image reading function section 20; and a changeover switch 82 as an example of a switch section that selectively sets either the connection state or the shutoff state between (i) the signal/power reception section 103 and (ii) a card read section 40 and a data output section 50 in addition to the components of the multifunction device 4 of the first exemplary embodiment. The changeover switch 81, 82 is switched between the connection state and the shutoff state under the control of the control section 10.

Power supplied from the internal power supply 37 of the hub 3 through the signal/power reception section 103 is transmitted at all times to the MPU 101 of the control section 10, the operation panel 30, and the FAX function section 60.

Also in FIG. 6, as in FIG. 3, signal lines for transmitting signals such as a data signal and a control signal are indicated by dashed lines and power lines for supplying power to the respective function sections are indicated by solid lines.

In the multifunction device 4 (4A to 4C) of the second exemplary embodiment, if an image formation operation mode is set, the control section 10 sets the power switch 71 and the changeover switch 81, 82 to the connection state and executes the image formation operation in a similar manner to that in the first exemplary embodiment.

On the other hand, if image data is not input from any of the image reading function section 20, the FAX function section 60, etc., until a predetermined time period set by a user, for example, has elapsed since completion of the image formation operation mode, the control section 10 sets the power switch 71 and the changeover switch 81, 82 to the shutoff state almost simultaneously. Accordingly, power supply from the main power supply 70 to the image formation section 90 and power supply to the image reading function section 20, the card read section 40, and the data output section 50 are stopped. Accordingly, an operation state (called "sleep mode") in which power consumption is decreased more than that in the standby mode in which power supply only to the image formation section 90 is stopped in the first exemplary embodiment is set. As a result, the energy consumption of the whole communication system 1 is further decreased.

Even in the state where the sleep mode is set, power supplied from the internal power supply 37 of the hub 3 through the signal/power reception section 103 is transmitted at all times to the MPU 101 of the control section 10, the operation panel 30, and the FAX function section 60 as described above. Therefore, operation input by the user through the operation panel 30 or data signal input into the FAX function section 60 can be accepted.

If the user selects a signal input/output function section that he wants to activate through the operation panel 30 in the state where the sleep mode is set, the control section 10 starts up the function of the selected signal input/output function section. For example, if the image reading function section 20 is selected through the operation panel 30, the control section 10 sets the changeover switch 81 to the connection state. Accordingly, power is supplied to the image reading function section 20 through the signal/power reception section 103 and it becomes possible to read an image. The image read by the image reading function section 20 is converted into image data, which is then stored in an HDD 102 of the control section 10. Upon completion of storing the image data in the HDD 102, the control section 10 switches the changeover switch 81 to the shutoff state and again sets the sleep mode.

Likewise, if the user selects the card read section 40 or the data output section 50 through the operation panel 30, the control section 10 sets the changeover switch 82 to the connection state. Accordingly, power is supplied to the card read section 40 and the data output section 50 through the signal/power reception section 103, and it becomes possible to read and output data. Upon completion of the reading and outputting of the data, the control section 10 switches the changeover switch 82 to the shutoff state and again sets the sleep mode.

When the image data read by the image reading function section 20 is output through the data output section 50, the control section 10 sets both the changeover switches 81 and 82 to the connection state based on operation input through the operation panel 30. Upon completion of the outputting of the read image data through the data output section 50, the control section 10 switches the changeover switches 81 and 82 to the shutoff state and again sets the sleep mode.

Thus, the control section 10 has a function as a first switch control section that controls power supply from the signal/power reception section 103 to the function section between the connection state and the shutoff state and a function as a determination section that determines as to whether or not the function section continuously stops the function for a predetermined time period.

By the way, in the multifunction device 4 of the second exemplary embodiment, if image data is not input from any of the image reading function section 20, the FAX function section 60, etc., until the predetermined time period set by the user, for example, has elapsed since completion of the image formation operation mode, the control section 10 sets the power switch 71 and the changeover switch 81, 82 to the shutoff state almost simultaneously. Alternatively, after the image formation operation mode is completed and the power switch 71 is set to the shutoff state, the changeover switches 81 and 82 may be set to the shutoff state in sequence with a time lag. For example, if image data is not input from any of the signal/power reception section 103 of the control section 10, the image reading function section 20, the FAX function section 60, etc., until the predetermined time period set by the user has elapsed, the first the power switch 71 may be set to the shutoff state and the standby mode may be set at a first stage. Then, if image data is not input from any of the image reading function section 20, the FAX function section 60, etc., until the predetermined time period has elapsed, the changeover switch 81 is set to the shutoff state at a second stage. Further, if image data is not input from any of the image reading function section 20, the FAX function section 60, etc., until the predetermined time period has elapsed, the changeover switch 82 is set to the shutoff state at a third stage. Thus, stepwise settings can also be made in such a manner that first the standby mode is set and next the sleep mode is set.

Thus, in the communication system 1 of the second exemplary embodiment, power is supplied at all times from the internal power supply 37, which is included in the hub 3 that receives image data through the network 5, only to the MPUs 101 of the control sections 10 and some of the signal input/output function sections disposed in the multifunction devices 4A to 4C. Power is supplied to the other signal input/ output function sections, if necessary. Accordingly, the energy consumption of the whole communication system 1 can be further decreased.

Third Exemplary Embodiment

In the first exemplary embodiment, description has been made on the configuration that power is supplied at all times from the internal power supply 37 included in the hub 3 to the MPUs 101 of the control sections 10 and the signal input/output function sections of the image reading function sections 20, etc., disposed in the multifunction devices 4A to 4C. In a third exemplary embodiment of the invention, the following configuration will be described. That is, power is supplied selectively from the internal power supply 37 included in the hub 3 or the main power supplies 70 included in the multifunction devices 4A to 4C to MPUs 101 of the control sections 10 disposed in the multifunction devices 4A to 4C. Components similar to those of the first exemplary embodiment are denoted by similar reference numerals and will not be described again in detail.

Figure 7:
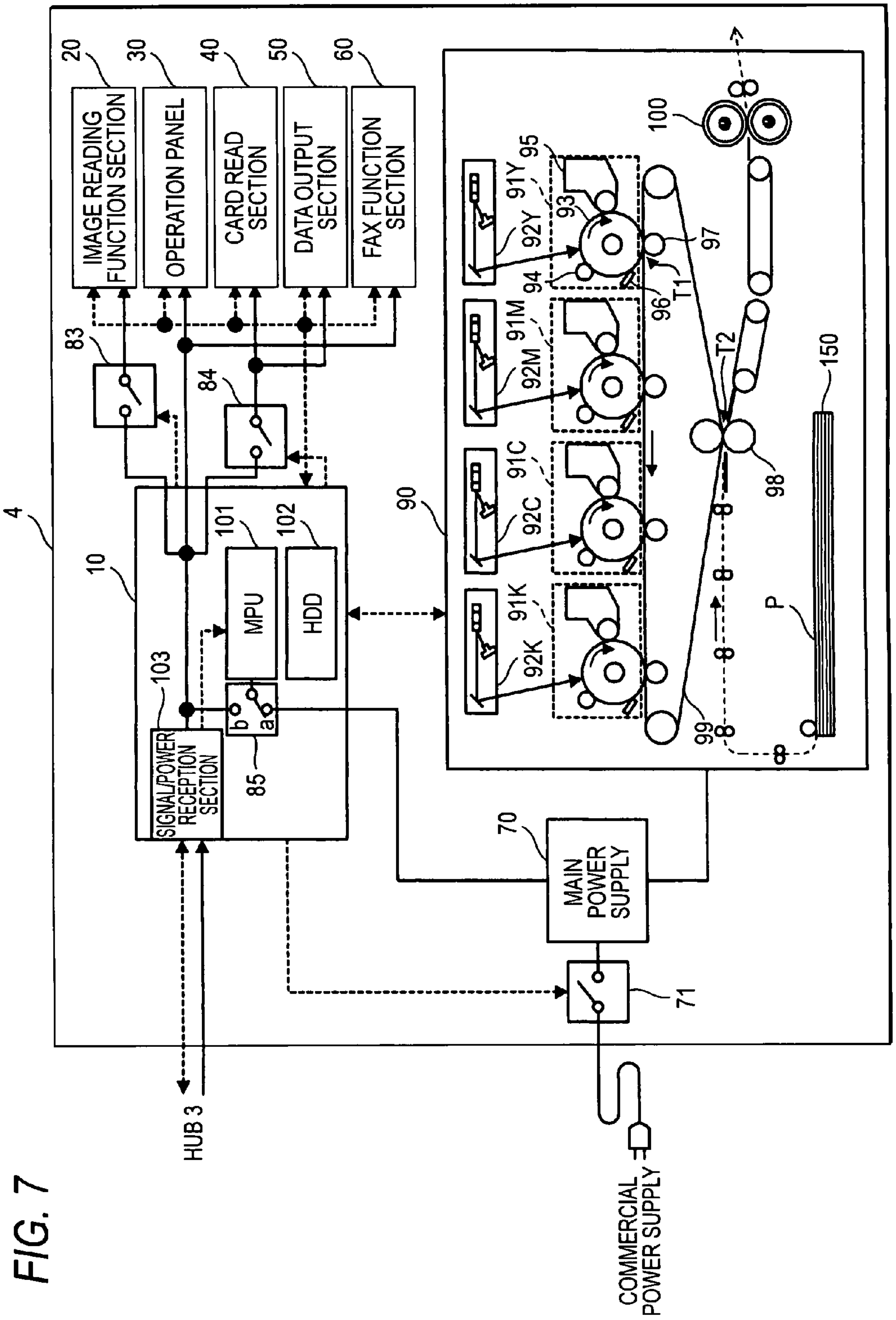
FIG. 7 is a block diagram to describe the functional configuration of a multifunction device.

FIG. 7 is a block diagram to describe the functional configuration of a multifunction device 4 of the third exemplary embodiment. The multifunction device 4 (4A to 4C) shown in FIG. 7 includes: a first changeover switch 85 as an example of a power supply source switch section that switches a power supply source to the MPU 101 of the control section 10; a second changeover switch 83 that selectively sets either a connection state or a shutoff state between the signal/power reception section 103 of the control section 10 and the image reading function section 20; and a third changeover switch 84 that selectively sets either a connection state or a shutoff state between (i) the signal/power reception section 103 and (ii) the card read section 40 and the data output section 50, in addition to the components of the multifunction device 4 of the first exemplary embodiment.

The first changeover switch 85 selectively sets, under the control of the control section 10, a state where power supply is received from the signal/power reception section 103 of the control section 10 or a state in which power supply is received from the main power supply 70.

Power is transmitted at all times from the signal/power reception section 103 to the operation panel 30 and the FAX function section 60.

Also in FIG. 7, as in FIG. 3, signal lines for transmitting signals such as a data signal and a control signal are indicated by dashed lines and power lines for supplying power to the respective function sections are indicated by solid lines.

Figure 8:
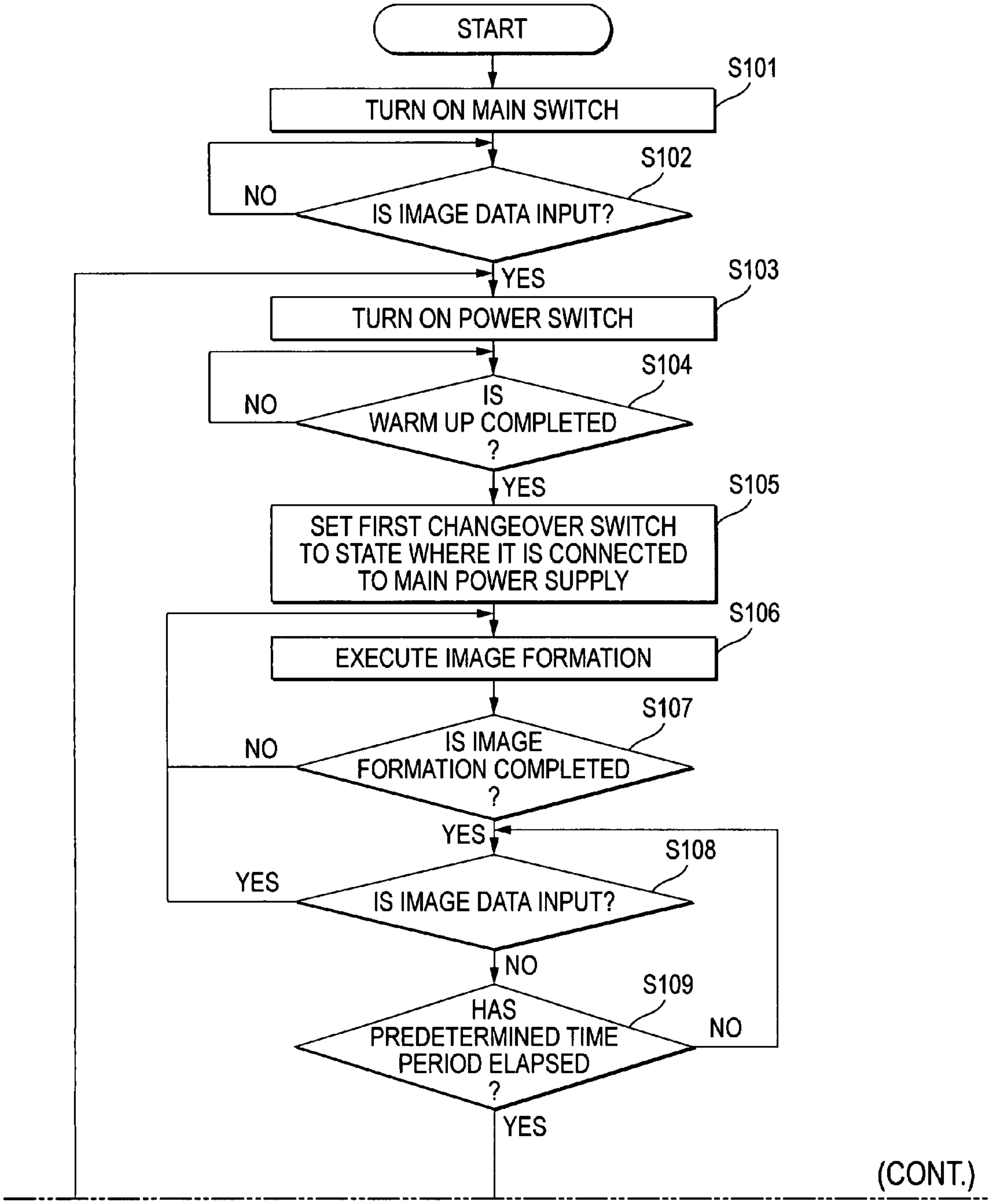
FIG. 8 is a flowchart to show an example of a process, executed by a control section, for controlling power supply to function sections.

Control of power supply to the respective function sections by the control section 10 will be discussed. FIG. 8 is a flowchart to show an example of a process, performed by the control section 10, of controlling power supply to the respective function sections. As shown in FIG. 8, a main switch (not shown) of the multifunction device 4 is turned on (S101). In this state, the first changeover switch 85, the second changeover switch 83, and the third changeover switch 84 are set to a state where power supply is received from the signal/power reception section 103.

Next, the control section 10 determines as to whether or not image data is input from any of the signal/power reception section 103, the image reading function section 20, the FAX function section 60, etc., or whether or not image data to be printed has been input to an HDD 102 (S102).

If it is determined at step 102 that image data is input or that image data to be printed has been input to the HDD 102, the control section 10 sets the image formation operation mode and sets the power switch 71 to the connection state (on) (S103). Then, power is supplied from the main power supply 70 to the image formation section 90 and it is started to warm up, that to heat the fuser 100 of the image formation section 90 to a temperature at which fixing can be performed.

When the fuser 100 reaches the temperature at which fixing can be performed and the warm up is completed (S104), the control section 10 sets the first changeover switch 85 to a state where power supply is received from the main power supply 70 (the first changeover switch 85 is connected to the main power supply 70) (S105). That is, the control section 10 sets the first changeover switch 85 to a terminal position "a" shown in FIG. 7. Thus, in the image formation operation mode in which power is supplied to the image formation section 90, power from the main power supply 70 is also supplied to the MPU 101 of the control section 10. Accordingly, the power from the signal/power reception section 103 to the signal input/output function sections of the image reading function sections 20, etc., increases by power supplied to the MPU 101. Therefore, lowering of the operation speed in the signal input/output function sections is suppressed.

Then, the control section 10 executes the image formation operation in the image formation section 90 (S106). Upon completion of all image formation (S107), the control section 10 monitors input of new image data (S108). If new image data is input, the control section 10 again executes the image formation operation (S106).

On the other hand, when the predetermined time period set by the user, for example, has elapsed since input of the last image data (S109), the control section 10 completes the image formation operation mode. The control section 10 sets the power switch 71 to the shutoff state (off) and sets the standby mode. At the same time, the control section 10 sets the first changeover switch 85 to a state in which power is supplied from the signal/power reception section 103 (the first changeover switch 85 is connected to the signal/power reception section 103) (S110). That is, the control section 10 sets the first changeover switch 85 to a terminal position "b" shown in FIG. 7. Accordingly, in the standby mode, the MPUs 101 of the control sections 10 and the signal input/output function sections of the image reading function sections 20, etc., in the multifunction devices 4A to 4C receive power from the internal power supply 37 of the hub 3 which functions as the power supply common to them. As a result, the energy consumption of the whole communication system 1 can be decreased.

After a transition to the standby mode is made, the control section 10 monitors input of image data (S111). If image data is input, the control section 10 returns to step 103 and executes the image formation operation.

On the other hand, after a transition to the standby mode is made, if image data is not input until a predetermined time period set by the user, for example, has elapsed (S112), the control section 10 sets the second changeover switch 83 and the third changeover switch 84 to a state in which power supply is not received from the signal/power reception section 103 (shutoff state) (S113). Accordingly, power supply to the image reading function sections 20, the card read section 40, and the data output section 50 is stopped. As a result, the sleep mode in which power consumption is decreased more than that in the standby mode is set, and the energy consumption of the whole communication system 1 can be further decreased.

At step 113, the second changeover switch 83 and the third changeover switch 84 may be set to the shutoff state in sequence with a time lag in place of the method of setting the second changeover switch 83 and the third changeover switch 84 to the shutoff state almost simultaneously. For example, if image data is not input from any of the signal/power reception section 103 of the control section 10, the image reading function section 20, the FAX function section 60, etc., until a predetermined time period set by the user has elapsed, first the second changeover switch 83 is set to the shutoff state at the first stage. Further, if image data is not input from any of the signal/power reception section 103 of the control section 10, the image reading function section 20, the FAX function section 60, etc., until a predetermined time period has elapsed, the third changeover switch 84 is set to the shutoff state at the second stage.

After step 113, the control section 10 monitors input of image data (S114). If image data is input, the control section 10 returns to step 103 and executes the image formation operation. On the other hand, if the main switch is turned off (S115), the control section 10 stops control. If the main switch is turned off, power is transmitted at all times from the signal/power reception section 103 to the MPU 101 of the control section 10, the operation panel 30, and the FAX function section 60. Therefore, image data input from the network 5, operation input by the user, and image data input in the FAX function section 60 can be accepted.

Thus, the control section 10 has a function as a second switch control section that controls power supply from the main power supply (second power output device, power output device) 70 to the image formation section (image formation section) 90 between the connection state and the shutoff state and a function as a third switch control section that selectively controls power supply to the control section 10 from either the signal/power reception section (reception section) 103 or the main power supply 70.

As described above, in the communication system 1 of the exemplary embodiments, in the standby mode, power is supplied from the internal power supply 37 included in the hub 3 to the MPUs 101 of the control sections 10 disposed in the multifunction devices 4A to 4C; in the image formation operation mode, power is supplied from the main power supplies 70 disposed in the multifunction devices 4A to 4C to the MPUs 101 of the control sections 10 disposed in the multifunction devices 4A to 4C. Accordingly, the power conversion efficiency of the internal power supply 37 included in the hub 3 is enhanced in the standby mode. Also, the power to the signal input/output function sections of the image reading function sections 20, etc., is set so as to increase by power supplied to the MPU 101 in the image formation operation mode. Therefore, lowering of the operation speed in the signal input/output function sections is suppressed.

What is claimed is:

1. A communication system comprising:

a relay device that comprises a first power output device and an output section, the first power output device configured to convert a voltage of a commercial power supply to a voltage to be output, the output section configured to output power of the converted voltage to a plurality of image formation apparatuses over a communication line; and the plurality of image formation apparatuses are connected to the relay device through the communication line and receive the power output from the relay device, wherein:

each of the image formation apparatuses comprises a function section that performs a function by using the power output from the relay device;

a second power output device that converts a voltage of a commercial power supply to a predetermined voltage, and that outputs power of the predetermined voltage;

an image formation section that forms an image on a medium by using the power of the predetermined voltage output from the second power output device; and a distribution-and-transmission section that receives the power output from the relay device and supplies the power output from the relay device to the function section, and the output section of the relay device is configured to output image information to be formed on the medium as the image to one of the plurality of image formation apparatuses based upon image formation apparatus identifying information contained within the image information.

2. The system according to claim 1, wherein the distribution-and-transmission section receives the image information from the output section of the relay device, and supplies the image information to the image formation section, and the image formation section forms the image corresponding to the image information on the medium.

3. The system according to claim 1, wherein each of the image formation apparatuses further comprises a switch section that selectively switches supply of the power from the distribution-and-transmission section to the function section between a connection state and a shutoff state.

4. The system according to claim 3, wherein if the function section continuously stops the function for a predetermined time period, the switch section sets the supply of the power to the shutoff state.

5. The system according to claim 1, wherein:

the function section includes a controller that controls the image formation section to form the image on the medium, and the image formation section further comprises a power supply source switch section that selectively switches between (i) supply of the power from the distribution-and-transmission section to the function section and (ii) supply of the power from the second power output device to the function section.

6. The system according to claim 1, wherein the relay device is connected to a plurality of the image formation apparatuses.

7. The system according to claim 1, wherein power consumption of the function section is smaller than power consumption of the image formation section.

8. The system according to claim 1, wherein the image formation apparatus identifying information includes at least a MAC address at a top of the image information.

* * * * *